United States Patent
Kreten et al.

(10) Patent No.: US 7,139,378 B2
(45) Date of Patent: Nov. 21, 2006

(54) METHOD FOR SIGNALING AN INCOMING CALL

(75) Inventors: Axel Kreten, Puchheim (DE); Holger Prange, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 367 days.

(21) Appl. No.: 10/149,715

(22) PCT Filed: Dec. 14, 2000

(86) PCT No.: PCT/DE00/04468

§ 371 (c)(1),
(2), (4) Date: Oct. 15, 2002

(87) PCT Pub. No.: WO01/45367

PCT Pub. Date: Jun. 21, 2001

(65) Prior Publication Data

US 2003/0076944 A1    Apr. 24, 2003

(30) Foreign Application Priority Data

Dec. 17, 1999 (DE) ............................ 199 61 077

(51) Int. Cl.
*H04M 3/42* (2006.01)
*H04M 3/46* (2006.01)
*H04M 3/54* (2006.01)

(52) U.S. Cl. .......................... 379/201.02; 379/207.2; 379/211.02; 379/211.03; 379/211.04

(58) Field of Classification Search ........... 379/201.01, 379/201.02, 207.02, 211.01, 211.02, 211.03, 379/211.04
See application file for complete search history.

(56) References Cited

U.S. PATENT DOCUMENTS

| 5,206,901 | A |   | 4/1993  | Harlow et al. ......... 379/211.01 |
| 5,371,781 | A |   | 12/1994 | Ardon ...................... 455/445 |
| 5,422,941 | A |   | 6/1995  | Hasenauer et al. ......... 379/246 |
| 5,454,032 | A | * | 9/1995  | Pinard et al. .......... 379/167.05 |
| 5,548,636 | A | * | 8/1996  | Bannister et al. ...... 379/390.01 |
| 5,752,191 | A |   | 5/1998  | Fuller et al. ................ 455/445 |
| 5,802,160 | A | * | 9/1998  | Kugell et al. .......... 379/211.04 |
| 5,815,563 | A |   | 9/1998  | Ardon .................... 379/211.01 |
| 6,094,478 | A | * | 7/2000  | Shepherd et al. ...... 379/211.02 |
| 6,304,649 | B1| * | 10/2001 | Lauzon et al. ......... 379/211.01 |
| 6,363,142 | B1| * | 3/2002  | Stumer ................... 379/211.01 |
| 6,405,041 | B1| * | 6/2002  | Mukerjee et al. ........... 455/445 |
| 6,721,412 | B1| * | 4/2004  | Youngs ................. 379/204.01 |

FOREIGN PATENT DOCUMENTS

DE    196 40 266 A1    4/1998
DE    198 52 774 A1    5/2000

OTHER PUBLICATIONS

"GeoCentrex: The Best Catch for Your Network" by Siemens AG; Sales and Marketing Guide; S. 42, 43, c. 1995.

* cited by examiner

*Primary Examiner*—Harry S. Hong
(74) *Attorney, Agent, or Firm*—Morrison & Foerster LLP

(57) ABSTRACT

According to the inventive method, an incoming call that is directed to a subscriber terminal (Tln 1) allocated to a subscriber group (Tln1 to Tln n) is signaled to the subscriber terminal (Tln 1) called and additionally to at least one subscriber terminal (Tln A3 to Tln An) that is located outside the signaling transmission range of the subscriber terminal called.

19 Claims, 2 Drawing Sheets

METHOD FOR SIGNALING AN INCOMING CALL

CLAIM FOR PRIORITY

This application claims priority to International Application No. PCT/DE00/04468 which was published in the German language on Jun. 21, 2001.

TECHNICAL FIELD OF THE INVENTION

The invention relates to a method for signaling an incoming call, and in particular to signaling an incoming call of a subscriber terminal which is associated with a subscriber group and which a subscriber can also accept on any other subscriber terminal associated with that subscriber group instead of on the subscriber terminal being called.

BACKGROUND OF THE INVENTION

Subscriber groups in this case are related, for example, with the feature "Centrex" (Central Office and Exchange). The Centrex feature allows subscriber terminals which are connected to a common telephone exchange, or are each connected to different telephone exchanges, in a telecommunications network via subscriber access lines to be combined to form a Centrex group. The subscribers who belong to the Centrex group may then be provided by the telephone exchange which is responsible for them with virtually the same service features which a private branch exchange (PBX) would offer them if their subscriber terminals were connected to it.

Typical service features which are provided to the Centrex subscribers, and some of which correspond to a private branch exchange are, for example:
  access to the telecommunications network by means of an access code,
  special charge handling for Centrex-internal connections,
  exchange authorizations for incoming and outgoing calls,
  call transfer,
  call pick up,
  service features relating to a call center (attendant features),
  secretary and team functions,
  various audible signals ("ringing" etc.).

In order to make it possible to provide the call pick up service feature which has been mentioned, a so-called call pick up group is formed within a Centrex group. A subscriber who belongs to a Centrex group may in this case be associated with a number of different call pick up groups.

The call pick up service feature and further service features which are related to the Centrex groups are described, by way of example, on pages 42 and 43 of a customer brochure "GeoCentrex: The Best Catch for your Network" from Siemens AG, issued in 1995 by Geschäftsgebiet Telekommunikationsnetze, Hofmannstr. 51, D-81359, Munich, Order No. A 308080-X3093-X100-1-7635. This brochure describes three types of call pick up service feature, namely call pick up within a group, directed call pick up and call pick up in conjunction with a night-time service, with the call pick up within a group service feature in practice being that which is most frequently used. According to this, Centrex subscribers are combined to form a Centrex call pick up group. This allows a subscriber who is associated with a call pick up group also to accept an incoming call which is directed to a subscriber terminal associated with that call pick up group at any other subscriber terminal which is associated with that call pick up group rather than on the called subscriber terminal. To do this, the subscriber dials a so-called call pick up access code on the subscriber terminal on which he wishes to take the call. There may also be a number of different call pick up groups within one Centrex group. In a situation where a number of incoming calls occur at the same time within a call pick up group and one subscriber wishes to take a call on another subscriber terminal in the described manner, the call which has already been waiting for the longest time is passed to this subscriber.

Operation of a call pick up service feature is dependent on each subscriber terminal which is associated with the call pick up group, as well as the subscriber, being located within a physical area which allows a call which is directed to a subscriber terminal which is associated with that call pick up group to be perceived audibly or visually by the subscribers. If the subscribers in a call pick up group are not located in such an area, i.e. within audible or visual range, for example because their workstations are accommodated in physically separate offices, then the subscribers cannot audibly or visually perceive an incoming call which is directed to a subscriber terminal which is located in a different office or room, and can thus not pick up the call in the described manner.

This disadvantage is particularly apparent when a call pick up group is set up throughout the network for subscribers whose subscriber terminals are connected to different exchanges. This is because the subscribers in a call pick up group whose subscriber terminals are connected to different exchanges are generally located in a physically separate area. An unfavorable situation such as this also occurs when mobile subscriber terminals in a mobile radio network are associated with such a call pick up group. The mobile terminals are generally not located within audible range of the other call pick up group members. The handling of Centrex service features with regard to subscribers to a mobile radio network and to a landline network has already been proposed in German Patent Application 198 52 774.8.

SUMMARY OF THE INVENTION

In one embodiment of the invention, the incoming call is signaled to the called subscriber terminal and to at least one subscriber terminal which is located beyond the signaling range of the called subscriber terminal.

In one aspect of the invention, the expression signaling range of a subscriber terminal should be understood as meaning the range of a call signal within which subscribers can perceive, for example audibly or visually, an incoming call. The subscriber terminal to which the incoming call is additionally signaled may also be connected to an exchange other than that of the called subscriber terminal. Furthermore, one subscriber terminal may be associated with a number of such subscriber groups.

One advantage according to the invention is that the call pick up service feature can be extended to subscribers whose subscriber terminals are each located beyond the signaling range, for example in separate rooms, or whose subscriber terminals are each connected to different exchanges in the telecommunications network. The call pick up service feature thus also operates beyond network boundaries. For example, a subscriber terminal in the subscriber group can be connected via a landline network connection to a switching center, and a further subscriber terminal may be a mobile terminal, which is normally connected via an air interface to a base station which is connected to a mobile switching center in a mobile network (for example GSM or UMTS) which is connected to said landline network.

According to another aspect of the invention, the call pick up service feature is extended to subscribers who use a telephone service via a packet switching data network (for example via voice over IP) which is connected to the landline network. According to this, an incoming call which is directed to a subscriber terminal which is associated with a subscriber group could also be signaled to subscriber terminals which belong to the subscriber group and can be accessed via such a data network. Conversely, incoming calls which are directed to such subscriber terminals which can be accessed via such a data network can also be signaled to subscriber terminals, which are associated with that subscriber group, on a landline network.

Furthermore, the additional signaling to the subscriber terminal which is located beyond the signaling range of the called subscriber terminal can be carried out in parallel or with a time delay with respect to the signaling of the incoming call to the called subscriber terminal.

In addition, the at least one subscriber terminal which is located beyond the signaling range of the called subscriber terminal can be defined in advance for receiving the additional signaling within the subscriber group, thus making it possible to shorten the delay time for the signaling process.

In another embodiment of the invention, a subscriber terminal which is associated with the subscriber group and is located beyond the signaling range of the called subscriber terminal to be associated with subgroups. Within a subgroup such as this, one subscriber terminal is defined for receiving the additional signaling. This makes it possible to define specific target groups within the subscriber group, for example people in a secretarial office or in a development laboratory, for receiving the additional signaling.

The subgroups are expediently formed such that the subscriber terminals which are associated with such a subgroup are located within the signaling range of the at least one subscriber terminal to which the incoming call is additionally signaled.

According to another embodiment of the invention, one or more subscriber groups are defined by the contents of a table which is stored in a switching center in a telecommunications network. The invention for defining in advance a subscriber terminal in the subscriber group for receiving the additional signaling within the subscriber group can be carried out more easily by amending the table contents.

In still another embodiment of the invention, specific table fields within the table define an individual subscriber group. The definition of the subscriber groups or, expressed in other words, the association of a subscriber terminal with a subscriber group, is in this case carried out by entering its call number in these table fields which are provided for that subscriber group. This ensures a level of clarity which is used in particular in conjunction with the maintenance and administration of this table.

Another embodiment of the invention provides for the one or more subscriber terminals to which the incoming call is additionally intended to be signaled to be defined by the contents of a further table. This further table is linked to the table which defines the subscriber group, and is likewise stored in the same switching center. This ensures that the association of a subscriber terminal with a subscriber group, as well as the at least one subscriber terminal to which the incoming call is additionally intended to be signaled, can be administered independently of one another. Data consistency between the two tables is ensured by linking them.

The table which defines the subscriber group and the further table which is linked to it are expediently stored in a central database in the switching center. This ensures consistent and rapid data access to the tables.

It is preferable for the further table to include at least the call number of the at least one subscriber terminal to which the incoming call is additionally intended to be signaled. Further call numbers can be entered in this table by subscriber terminals associated with that subscriber group.

Subgroups of the type mentioned above relating to a subscriber group may be formed, if required, by grouping these call numbers which are entered in the further table. Within such a subgroup, at least one call number may then be identified as a special call number to whose subscriber terminal the incoming call is additionally intended to be signaled. Groupings such as this allow subscriber terminals in the subscriber group, which are located within signaling range, for example arranged in a common room, to be associated with such a subgroup. Those subscriber terminals in a subscriber group which are connected to the same switching center may also be combined to form such a subgroup.

Another embodiment of the development provides that after each incoming call, at least one call number other than the at least one already identified call number is in each case identified within such a subgroup in accordance with a predetermined sequence or a sequence which is defined by a random principle. This means that the incoming call is not always additionally signaled to a single subscriber terminal or to the same subscriber terminals in a subgroup, but that other subscriber terminals are also used for the additional signaling of the incoming call.

In conjunction with the subgroups which are formed within a subscriber group, at least one call number is expediently identified in the table which defines that subscriber group. This identification is used for the purpose of carrying out additional signaling of the call to the at least one other subscriber terminal in the case of an incoming call which is directed to the subscriber terminal associated with the identified call number. This procedure once again makes it easy to administer the data records entered in this table.

Still another embodiment of the invention provides that the call number of the called subscriber terminal and/or of the calling subscriber terminal is indicated on a display for the at least one subscriber terminal to which an incoming call is additionally signaled. This means that the subscriber who accepts the incoming call on a subscriber terminal is informed of the subscriber terminal to which the call was originally directed, and/or the subscriber terminal from which the call is coming. He can thus presume the intention of the calling subscriber and react appropriately to this, if necessary.

According to a another embodiment of the invention, the entries in the tables can be administered from one subscriber terminal. This allows each subscriber in a subscriber group to enter individual wishes in the tables. For example, each subscriber can define that subscriber group or those subscriber groups to which he wishes to belong, and he can also define those subscriber terminals to which a call which is directed to his subscriber terminal should additionally be signaled, and this is advantageous when one subscriber has a number of subscriber terminals, which may be connected to different switching centers. For example, in a situation where the subscriber sometimes works in the office and sometimes works at home, he can then include his subscriber terminals which he has installed at home in a subscriber group by entering their call numbers in said tables. Furthermore, at times when he is traveling, he may also, if required, associate the mobile terminal that he has with a subscriber group.

In order to provide protection against unauthorized access, administration of the entries may be allowed after a subscriber authorization process has been successfully carried out.

According to still another embodiment of the invention, the association of a subscriber terminal with a subscriber group and/or with any subgroup which may exist is applicable within a time interval which can be set or within a recurrent time period. This allows the subscriber to be relieved of regular administration of the entries in said tables. For example, this provides for the subscriber to work at home on a specific day of the week. In this case, it is possible to specify for this day of the week that the subscriber terminal which is located in the subscriber's home area will be associated with a specific subscriber group for his working area.

BRIEF DESCRIPTION OF THE DRAWINGS

An exemplary embodiment of the invention will be explained in more detail in the following text with reference to the drawings, in which.

DETAILED DESCRIPTION OF THE PREFERRED EMBODIMENTS

Figure 1:
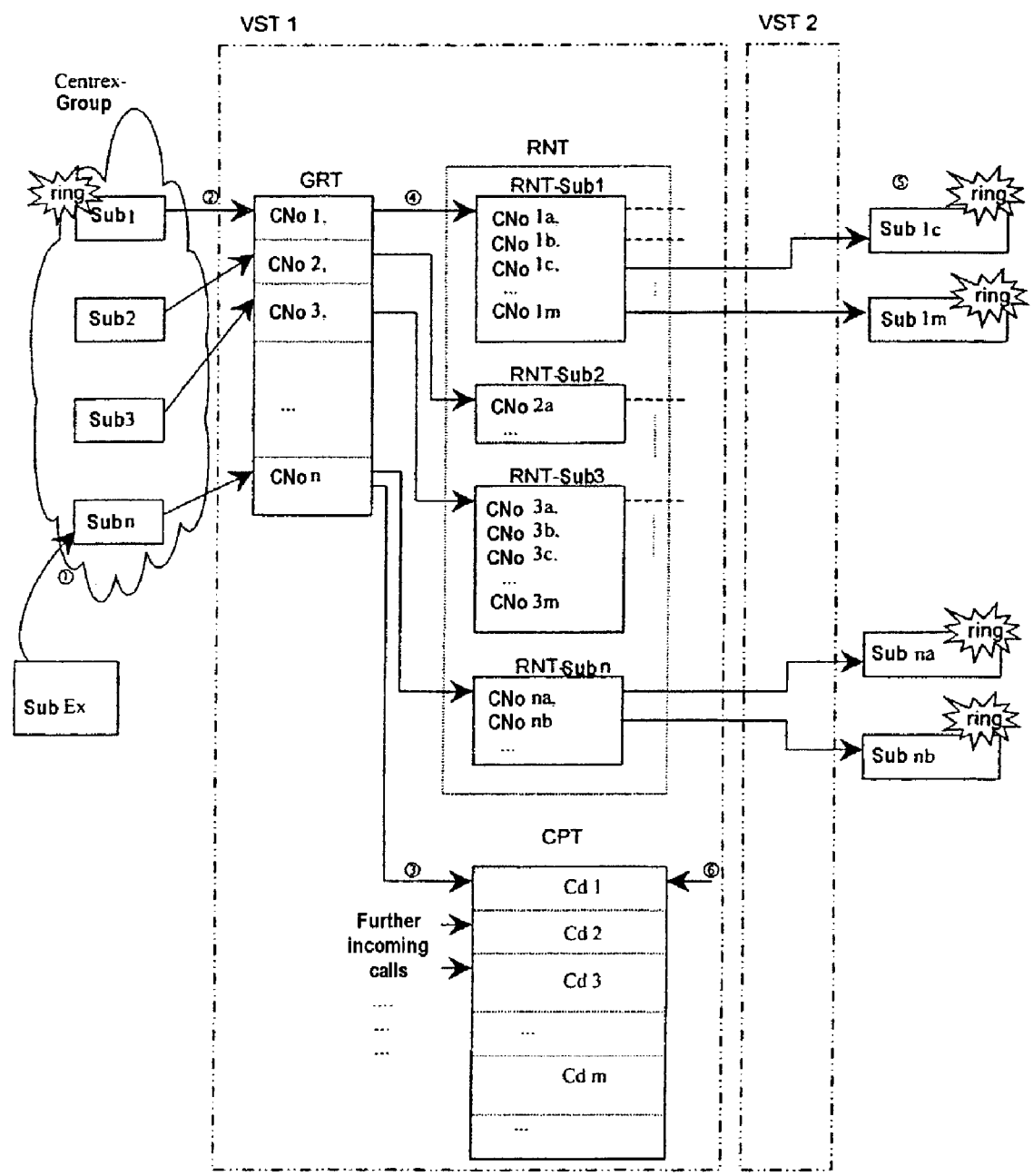
FIG. 1 shows a first constellation of subscriber terminals and switching centers within a telecommunications network.

FIG. 1 shows two switching centers VST 1 and VST 2, which are identified by dashed lines. These symbolize switching centers within a communications network. For example, the switching center VST 1 could represent a telecommunications exchange within a landline network, and the switching center VST 2 could represent a mobile switching center within a mobile radio network. In the same way, the switching center VST 2 could represent a switching node or a router within a packet switching network. Furthermore, the figure shows subscriber terminals Sub 1, Sub 2, Sub 3 to Sub n, from and to which calls are passed from and to the switching center VST 1. The subscriber terminals are combined to form a so-called Centrex group, as is intended to be indicated by a cloud around the subscriber terminals Sub 1 to Sub n. Incoming calls from and to the subscriber terminals Sub 1c, Sub na to Sub nb indicated in the figure are passed from and to the switching center VST 1 via the switching center VST 2. Various tables GRT, RNT and CPT are shown within the switching center VST 1, and these are normally stored in a central database which is provided in the switching center but is not illustrated in the figure. The table GRT symbolizes a group table for a subscriber group, for example a call pick up group, in which the call numbers CNo 1 to CNo n for the respective subscriber terminals Sub 1 to Sub n are combined.

The table RNT represents a call number table, which is once again subdivided into subtables RNT-Sub1 to RNT-Sub n. These subtables in include the call numbers (for example the table RNT-Sub 1 include the call numbers CNo 1a to CNo 1m) having corresponding subscriber terminals, for example Sub 1c to Sub 1m, to which a call is directed to the subscriber terminal Sub 1 and is additionally intended to be signaled. By way of example, the call number CNo 1a which is entered in the subtable RNT-Sub 1 could be a call number for a subscriber terminal for a subscriber who is at his workplace, and the call number CNo 1m could be the call number for a mobile terminal, within a mobile radio network, for the same subscriber. It is also feasible, for example, for the call number CNo. 3a to represent a call number or a network address (for example an IP address) for a subscriber who can be accessed via a data network (for example via the Internet) which is connected to the switching center VST 1 and who is using, for example, so-called voice over IP services.

The calls which are directed to the subscriber terminal associated with the pick up group are stored temporarily in the table CPT, as is symbolized by Cd 1 to Cd m in the figure.

Furthermore, FIG. 1 shows a subscriber terminal Sub Ex which may be connected to any switching center (not illustrated in the figure) in the telecommunications network.

FIG. 1 will be explained in the following text relating to the method according to the invention and are identified by the numbers 1–6.

In 1, an external subscriber who is not part of the Centrex group uses his subscriber terminal Sub Ex to call a subscriber terminal, for example Sub 1, which is associated with a call pick up group, for a Centrex subscriber. A ringing tone then sounds on the subscriber terminal Sub 1, as is identified by "Ring" in the figure. In 2, the call number entries in the table GRT are used to check whether the subscriber device Sub 1 is associated with a call pick up group. In the situation where the subscriber terminal Sub 1 is associated with a call pick up group, the following steps are carried out:

In 3, the call number of the calling subscriber is entered in a transient table CPT which is used to temporarily store all the calls that are waiting for that call pick up group, with the call numbers of the calling subscriber terminals Cd 1 to Cd m based on the so-called FIFO principle (first in first out). In 4, those call numbers, for example CNo 1a to CNo 1m are looked for in the subtable RNT-Sub 1, which is provided for the subscriber terminal TN 1, in the call number table RNT to whose subscriber terminals, for example Sub 1c to Sub 1m, the call which is directed to the subscriber terminal Sub 1 is also intended to be signaled. Finally, in 5, the connection setting-up request which is initiated by the external subscriber Sub Ex is preferably signaled not only to the subscriber terminal Sub 1 but also at the same time and in parallel, or with a time delay, to the subscriber terminals Sub 1c to Sub 1m, corresponding to their call numbers as entered in the table RNT-Sub 1. This is indicated in the figure by "Ring" which symbolizes a ringing tone. The call number of the called subscriber and/or the call number of the calling subscriber is also indicated on a display on each subscriber terminal to which the incoming call is additionally intended to be signaled. When a call pick up subscriber accepts the signaled call on a subscriber terminal, for example Sub lm, that incoming call is connected to the subscriber terminal. At the same time, the additional call signaling to the other subscriber terminals is stopped. In 6, the call number of the subscriber terminal Sub 1 to which the call was originally directed is removed from the table CPT.

The elements illustrated in FIG. 2 differ from those illustrated in FIG. 1 as explained in the following text:

Each of the call numbers CNo 1 to CNo n are followed by "P" markings in the table GRT. These call number markings define which calls, which are directed to the subscriber terminal corresponding to the call number entered in the GRT, are additionally intended to be signaled to further subscriber terminals. Furthermore, a table OffRNT is shown, which is very similar to the call number table RNT in FIG.

1. The table is once again subdivided into subtables Off A to Off Z. The subtables Off A to Off Z include call numbers, for example CNo A1 to CNo An, whose subscriber terminals, for example Sub A1 to Sub A2, are located in an area within which the calls which are signaled to these subscriber terminals can be perceived audibly or visually. Such an area within audible or visual signaling range is indicated in the figure by clouds, which are identified by dashed lines, for example around the subscriber terminals Sub A3 to Sub An and Sub Z1 to Sub Z2. By way of example, the subscriber terminals with the call numbers CNo A1 to CNo An may be located in an office area of a room, while the subscriber terminals with the call numbers CNo Z1 and CNo Z2 may be installed in some other office area, which is physically separate from the first mentioned office area.

Figure 2:
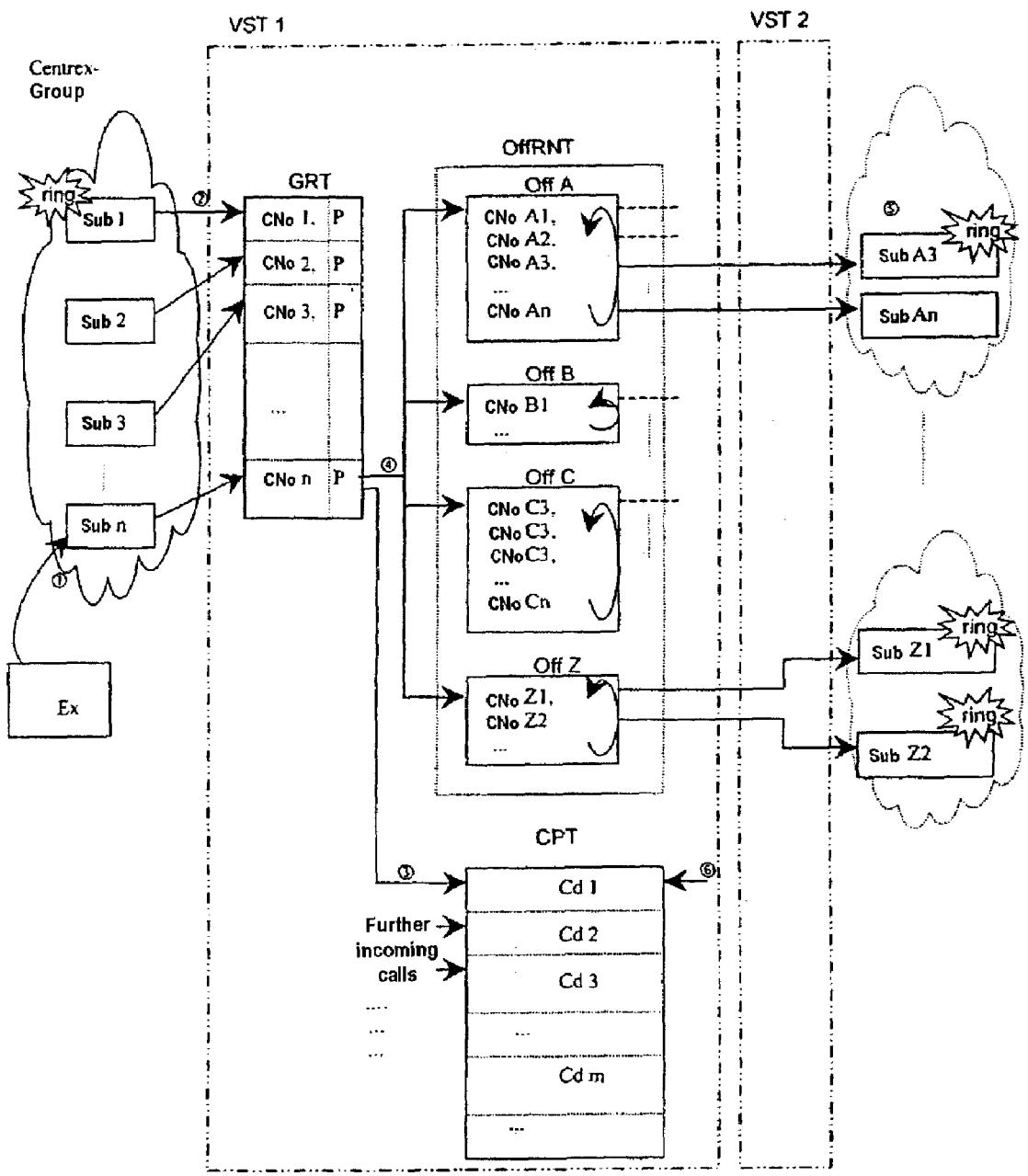
FIG. 2 shows a second such constellation within a telecommunications network.

The invention as shown in FIG. 2 corresponds essentially to 1, 2, 3 and 6 explained in conjunction with FIG. 1. The table GRT in FIG. 2 shows, for example, that the call number CNo 1 is identified by a "P". This indicates that a call which is directed to the subscriber terminal Sub 1 is additionally intended to be signaled to further subscriber terminals in the call pick up group. Accordingly, in 4, a call number (for example the call numbers CNo A1, CNo B1, CNo C3 and CNo Z2), to whose subscriber terminals (for example Sub A1, Sub B1, Sub C3 and Sub Z2) the call which is directed to the subscriber terminal Sub 1 is additionally intended to be signaled is looked for among all the subtables Off A to Off Z which are included in the table OffRNT and which each represent the subscriber terminals within an area within audible or signaling range. These call numbers may in this case be looked for among the subtables by at least one call number being identified by a marking in the respective subtables. A marking such as this may either be defined permanently for a single call number or for a number of specific call numbers, or may be moved, after each incoming call has been successfully handled, from one call number to another call number in the subtable, in a specific sequence or in a sequence defined by a random principle. In the figure, this "movement" of the marking is indicated by an arrow curved in a circular shape in the subtables Off A to Off Z. In the end, this procedure leads, in 5, to an incoming call either being additionally signaled to the same subscriber terminal, for example Sub A3 within an area within audible or visual signaling range, for example an office area, or always to a different subscriber terminal, on an alternating basis.

The tables GRT, RNT and OffRNT as well as the subtables RNT-Sub 1 to RNT-Sub n and Off A to Off Z may also be administered from one subscriber terminal once one subscriber has been authorized as a subscriber group member (call pick up group) by means of an access code. This means that a subscriber terminal which is used by one subscriber may be associated with the corresponding subscriber group either temporarily or permanently. By way of example, he can include either his telephone at home or his mobile terminal, which is used in a mobile radio network, in the call pick up group for his working area in the office at certain times, so that he can audibly or visually perceive calls to other subscriber terminals associated with that call pick up group and can then accept them and, conversely, his colleagues in the office can perceive and accept incoming calls which are directed to his subscriber terminals.

It is likewise feasible for one or more subscriber terminals to be associated with a call pick up group (instead of this being done by manual administration) automatically as a function of a specific time, for example from 1400 to 1800 hrs, or periodically, for example only on Mondays, so that incoming calls can also additionally be signaled to these subscriber terminals.

What is claimed is:

1. A method for signaling an incoming call directed to a subscriber terminal associated with a subscriber group, comprising:

optionally accepting another subscriber terminal associated with the subscriber group instead of the subscriber terminal being called; and signaling the incoming call to the called subscriber terminal and to at least one subscriber terminal which is located beyond the signaling range of the called subscriber terminal, wherein the subscriber terminals associated with the subscriber group and located beyond the signaling range of the called subscriber terminal are associated with subgroups within which the incoming call is additionally signaled to at least one subscriber terminal in a respective subgroup.

2. The method as claimed in claim 1, wherein the additional signaling to the at least one subscriber terminal located beyond the signaling range of the called subscriber terminal is carried out in parallel or with a time delay for signaling the incoming call to the called subscriber terminal.

3. The method as claimed in claim 1, wherein the at least one subscriber terminal located beyond the signaling range of the called subscriber terminal is defined in advance for receiving the additional signaling within the subscriber group.

4. The method as claimed in claim 1, wherein the subscriber terminals associated with the subgroup are located within the signaling range of the at least one subscriber terminal to which the incoming call is additionally signaled.

5. The method as claimed in claim 1, wherein one or more subscriber groups are defined by the contents of a table which is stored in a switching center in a telecommunications network.

6. The method as claimed in claim 5, wherein a subscriber terminal is associated with a subscriber group by entering a call number in table fields which are provided for the subscriber group within the table.

7. The method as claimed in claim 5, wherein at least one subscriber terminal to which the incoming call is signaled is defined by the contents of another table which is stored in the switching center and is linked to the table which defines that subscriber group.

8. The method as claimed in claim 5, wherein the table which defines the subscriber group, and the another table linked thereto, are stored in a central database in the switching center.

9. The method as claimed in claim 7, wherein at least the call number of the at least one subscriber terminal to which the incoming call is signaled is entered in the another table.

10. The method as claimed in claim 9, wherein the subgroups are formed by grouping call numbers, which are entered in the another table of subscriber terminals, within which subgroups at least one call number is identified as a special call number with a subscriber terminal having the incoming call as the signaled.

11. The method as claimed in claim 10, wherein, after each incoming call, at least one call number other than the at least one already identified call number is identified within a subgroup in accordance with a predetermined sequence or a sequence which is defined by a random principle.

12. The method as claimed in claim 10, wherein, in the table which defines the subscriber group, at least one call number is identified for additional signaling of the incoming call which is directed to the subscriber terminal to the at least one subscriber terminal which is located beyond the signaling range.

13. The method as claimed in claim 1, wherein the call number of the called subscriber terminal and/or of the calling subscriber terminal is indicated on a display for the at least one subscriber terminal to which an incoming call is signaled.

14. The method as claimed in claim 1, wherein entries in the tables are administered from one subscriber terminal.

15. The method as claimed in claim 14, wherein administration of the entries is allowed after a subscriber authorization process has been successfully performed.

16. The method as claimed in claim 1, wherein the association of a subscriber terminal with a subscriber group and/or with any subgroup is applicable within a time interval which is set or within a recurrent time period.

17. The method as claimed in claim 6, wherein at least one subscriber terminal to which the incoming call is signaled is defined by the contents of another table which is stored in the switching center and is linked to the table which defines that subscriber group.

18. The method as claimed in claim 7, wherein the table which defines the subscriber group, and the another table linked thereto, are stored in a central database in the switching center.

19. The method as claimed in claim 8, wherein at least the call number of the at least one subscriber terminal to which the incoming call is signaled is entered in the another table.

* * * * *